(12) United States Patent
Kim et al.

(10) Patent No.: US 7,815,330 B2
(45) Date of Patent: Oct. 19, 2010

(54) BACKLIGHT ASSEMBLY AND DISPLAY DEVICE HAVING THE SAME

(75) Inventors: Jeom-oh Kim, Buan-gun (KR); Gi-cherl Kim, Yongin-si (KR); Se-ki Park, Suwon-si (KR); Eui-jeong Kang, Asan-si (KR); Seok-won Kang, Gwangju-si (KR); Yong-hoon Kwon, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 282 days.

(21) Appl. No.: 12/013,150

(22) Filed: Jan. 11, 2008

(65) Prior Publication Data

US 2009/0122544 A1      May 14, 2009

(30) Foreign Application Priority Data

Nov. 13, 2007    (KR) .................. 10-2007-0115623

(51) Int. Cl.
*G09F 13/04*    (2006.01)
*G09F 13/08*    (2006.01)

(52) U.S. Cl. ............... 362/97.3; 362/241; 362/249.06; 313/500; 349/67

(58) Field of Classification Search ....... 362/97.1–97.3, 362/241, 247, 249.02, 249.06; 313/500; 349/67
See application file for complete search history.

(56) References Cited

U.S. PATENT DOCUMENTS

| 4,935,665 | A  | * | 6/1990 | Murata ...................... 313/500 |
| 7,478,929 | B2 | * | 1/2009 | Kim ........................... 349/67 |
| 2006/0215075 | A1 | * | 9/2006 | Huang et al. ................. 349/67 |

FOREIGN PATENT DOCUMENTS

| JP | 2006-190636 | 7/2006 |
| KR | 10-0626365 | 9/2006 |
| KR | 10-2006-0126030 | 12/2006 |

* cited by examiner

*Primary Examiner*—Stephen F Husar
(74) *Attorney, Agent, or Firm*—Cantor Colburn LLP

(57) ABSTRACT

A backlight assembly, which can provide enhanced light emitting efficiency, and a display device, are provided. The backlight assembly includes a light generating unit comprising a substrate and a point light source connected to the substrate, and a receiving container positioned to receive light from the light generating unit, the receiving container comprising an embossing that corresponds to the point light source.

25 Claims, 3 Drawing Sheets

BACKLIGHT ASSEMBLY AND DISPLAY DEVICE HAVING THE SAME

CROSS-REFERENCE TO RELATED APPLICATIONS

This application claims priority to Korean Patent Application No. 2007-0115623 filed on Nov. 13, 2007 the contents of which are herein incorporated by reference in their entireties.

BACKGROUND OF THE INVENTION

1. Field of the Invention

The present invention relates to a backlight assembly, and a display device having the backlight assembly. More particularly, the present invention relates to a backlight assembly providing enhanced light emitting efficiency and omitting the encapsulation process, and a display device having the backlight assembly.

2. Description of the Related Art

Generally, a liquid crystal display (LCD) device is a type of flat panel display device that displays an image using electrical and optical characteristics of a liquid crystal.

The LCD device includes a liquid crystal control unit that controls the liquid crystal material and a light-providing unit that provides light to the liquid crystal. For example, the LCD device includes an LCD panel serving as the liquid crystal control unit, and a backlight assembly serving as the light-providing unit.

The backlight assembly includes a light source that generates light. Examples of the light source include a cold cathode fluorescent lamp (CCFL) having a cylindrical shape and a light emitting diode (LED) having a dot shape.

A backlight assembly of a direct illumination type LCD, which employs an LED as a light source, includes a printed circuit board (PCB) for driving the LED in a receiving space of a receiving container. The PCB is disposed on a bottom plate of the receiving container, and the LED is mounted on the PCB.

Chip on board (COB) is a method in which an LED is directly mounted on the PCB without a package. The COB process requires the encapsulation process for molding. The encapsulation process is difficult process because it is difficult to control.

SUMMARY OF THE INVENTION

The present invention provides a backlight assembly with enhanced light emitting efficiency and which omits the encapsulation process due to using a receiving container and a point light source positioned toward the receiving container.

The present invention also provides a display device utilizing the above-mentioned backlight assembly.

In one aspect of the present invention, a backlight assembly includes a light-generating unit and a receiving container. The light-generating unit includes at least one point light source generating light and a power supply line supplying a power source for driving the point light source. The receiving container receives the light-generating unit and has an embossing that corresponds to the point light source.

The receiving container includes a bottom plate and a sidewall protruding from an edge portion of the bottom plate to define a receiving space.

The backlight assembly may further include a power supply line configured to supply a power source for driving the point light source.

The point light source includes a light emitting diode (LED) chip generating light.

In an exemplary embodiment, the section of embossing has a spherical shape.

In another exemplary embodiment, the light emitting diode and the embossing are arranged in a matrix.

In another exemplary embodiment, the light emitting diode and the embossing are arranged in a zigzag pattern.

In another exemplary embodiment, the embossing is filled with filler. The filler includes at least one of silicon, epoxy and acryl.

In another aspect of the present invention, a display device includes a display unit and a backlight assembly. The display unit includes a first substrate having pixel electrodes and a second substrate located opposite the first substrate. The second substrate includes a color filter corresponding to the pixel electrodes to display images. A backlight assembly includes a light-generating unit and a receiving container. The light-generating unit includes at least one point light source generating light and a power supply line transferring a power source for driving the point light source. The receiving container receives the light-generating unit and has an embossing that corresponds to the point light source.

The receiving container includes a bottom plate and a sidewall protruding from an edge portion of the bottom plate to define a receiving space.

The backlight assembly may further include a power supply line configured to supply a power source for driving the point light source.

The point light source includes a light emitting diode (LED) chip generating light.

In an exemplary embodiment, the section of embossing has a spherical shape.

In another exemplary embodiment, the light emitting diode and the embossing are arranged in a matrix.

In another exemplary embodiment, the light emitting diode and the embossing are arranged in a zigzag pattern.

In another exemplary embodiment, the embossing is filled with filler. The filler includes at least one of silicon, epoxy and acryl.

According to the above description, it is easy to control light, thereby light emitting efficiency is enhanced and the encapsulation process is omitted, thereby reducing manufacturing cost of a backlight assembly having a point light source.

BRIEF DESCRIPTION OF THE DRAWINGS

The above and other features and advantages of the present invention will become more apparent by describing in detail exemplary embodiments thereof with reference to the accompanying drawings, in which.

DESCRIPTION OF THE EMBODIMENTS

Figure 1:
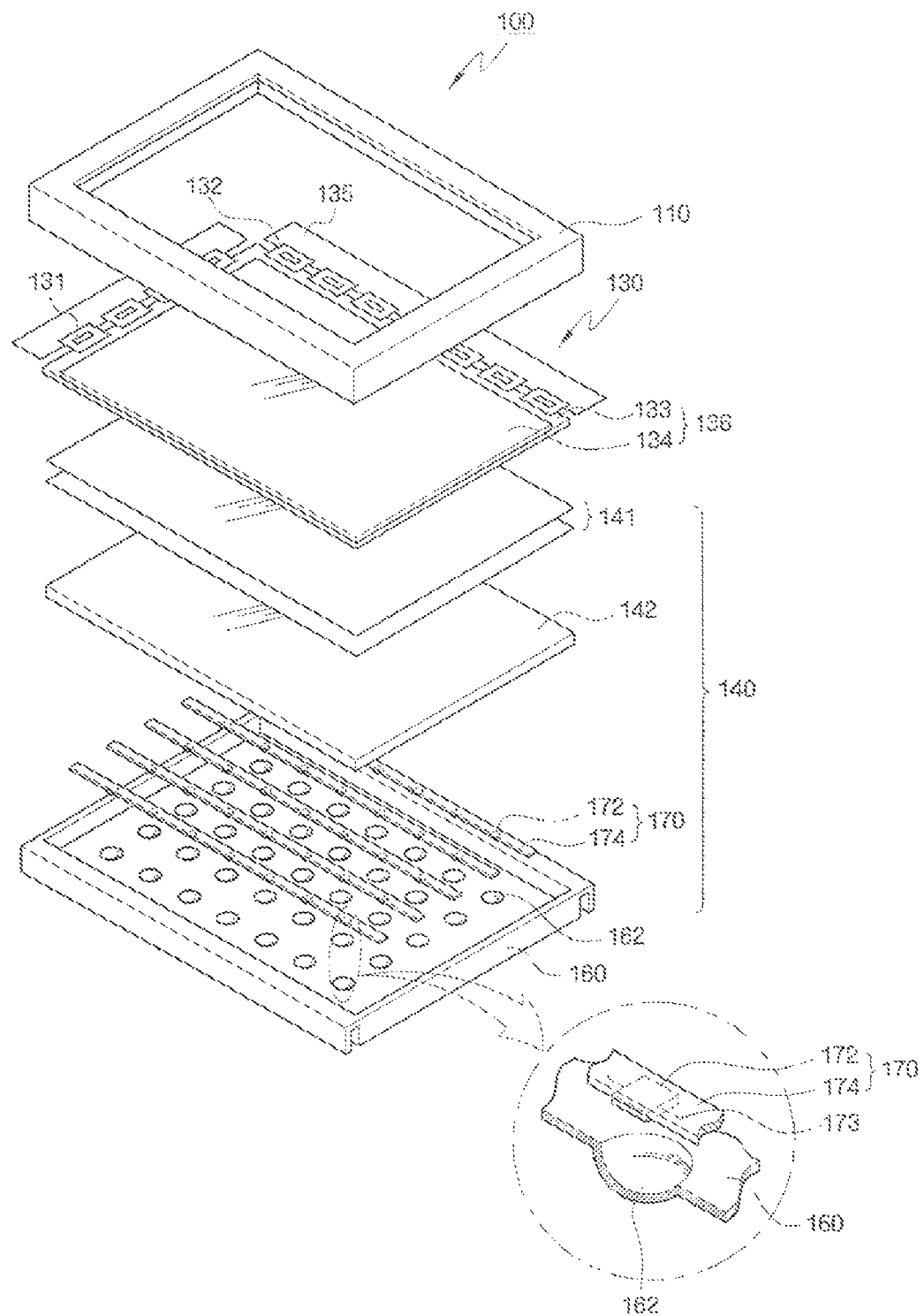
FIG. 1 is an exploded perspective view illustrating a backlight assembly according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is an exploded perspective view illustrating a backlight assembly according to an embodiment of the present invention.

Referring to FIG. 1, a liquid crystal display 100 according to an embodiment of the present invention includes a liquid crystal panel assembly 130, a backlight assembly 140, an upper container 110, and a receiving container 160.

The liquid crystal panel assembly 130 includes a liquid crystal panel 136 including a first substrate 133, an second substrate 134 and a liquid crystal layer (not shown) inserted between the display substrates, a gate chip film package 131, a data chip film package 132, and a printed circuit board 135.

The liquid crystal panel 136 includes the first substrate 133 that includes gate lines (not shown), data lines (not shown), a thin film transistor array, pixel electrodes and the second substrate 134 that includes color filters, a black matrix, and a common electrode and faces the first substrate 133. The color filters and common electrode may be formed on the first substrate 133. The liquid crystal panel 136 displays image information.

The gate chip film package 131 is connected to each gate line (not shown) formed on the first substrate 133 and provides each gate line with gate driving signals. The data chip film package 132 is connected to each data line (not shown) formed on the first substrate 133 and provides each data line with data driving signals. The gate chip film package 131 and data chip film package 132 include a Tape Automated Bonding (TAB) tape with a semiconductor chip bonded with a wiring pattern formed on a base film by Tape Automated Bonding (TAB). For example, for the gate and data chip film packages 131, 132, a tape carrier package (TCP) or a chip on film (COF) can be used according to an embodiment of the present invention.

The printed circuit board 135 is mounted with a variety of driving elements that process gate driving signals inputted into the gate chip film package 131 and data driving signals inputted into the data chip film package 132. The printed circuit board 135 is connected with the liquid crystal panel 136 and provides image information to the liquid crystal panel 136.

The backlight assembly 140 includes optical sheets 141, a diffuser plate 142 and a light generating unit 170. The light generating unit 170 includes a point light source 172, a power supply line 173 and a substrate 174.

The diffuser plate 142 diffuses light supplied from the light generating unit 170 to the liquid crystal panel 136. The diffuser plate 142 includes a plate made of a transparent material.

The point light source 172 may be an LED, an incandescent lamp, or a white halogen lamp. Each of the point light source 172 includes a blue chip and yellow phosphor. Each of the point light source 172 may include red, green, and blue light emitting chips. White light is produced by mixing red, green, and blue light emitted from each light emitting chip. The substrate 174 may be formed of a printed circuit board (PCB) or a flexible printed circuit board (FPC).

The power supply line 173 is formed on the substrate 174, and supplies the driving voltage generated from the power supply unit (not shown) to the point light sources 172.

Chip on board (COB) is the method in which an LED is directly mounted on the PCB without a package. COB needs an encapsulation process such as molding. The encapsulation process is a difficult process because the process is hard to control. But, the present invention shows that the backlight assembly doesn't need the encapsulation process.

The light generating unit 170 is received by the receiving container 160. The receiving container 160 has an embossing 162 corresponding to the point light source 172. The embossing 162 reflects and gathers the light from the light generating unit 170. The embossing 162 is used to control the light from the light generating unit 170.

Figure 2:
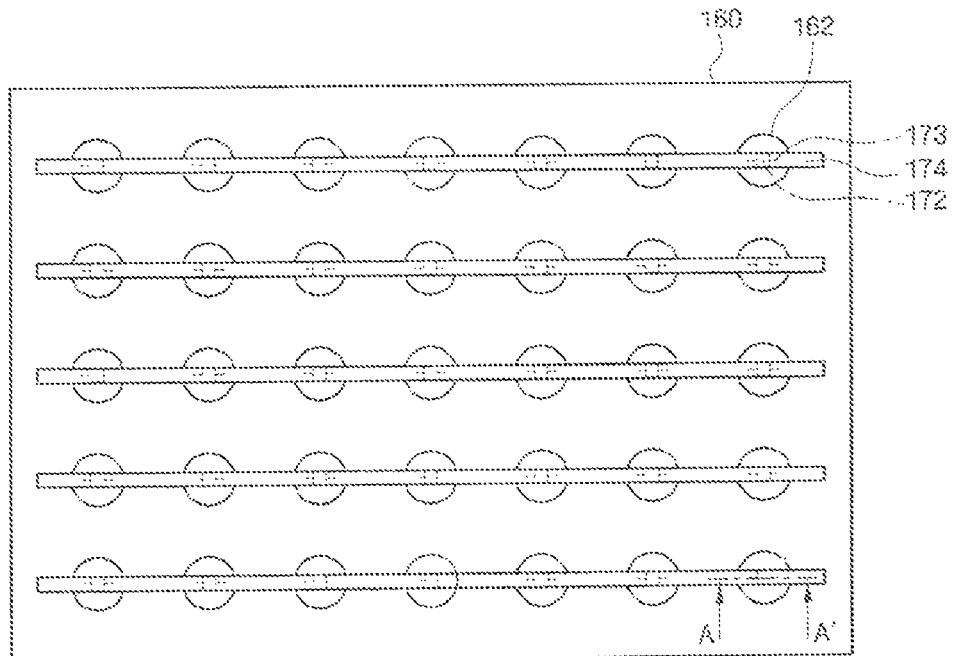
FIG. 2 is a plan view illustrating an embodiment of the backlight assembly illustrated in FIG. 1.

FIG. 2 is a plan view illustrating an embodiment of the backlight assembly illustrated in FIG. 1.

Referring to FIG. 2, the light generating unit 170 includes the point light sources 172, the power supply line 173 and the substrate 174. The point light source 172 is connected to the substrate and the power supply line 173 supplies the driving voltage generated to the point light source 172.

The receiving container 160 has an embossing 162 corresponding to the point light source 172. The embossing 162 reflects and gathers the light from the light generating unit 170. The embossing 162 is used to control the light from the light generating unit 170. The point light source 172 and the embossing 162 may be arranged in a matrix type pattern. This pattern is a general method of arranging the point light source. The pattern is such that the rows and columns are aligned.

Figure 3:
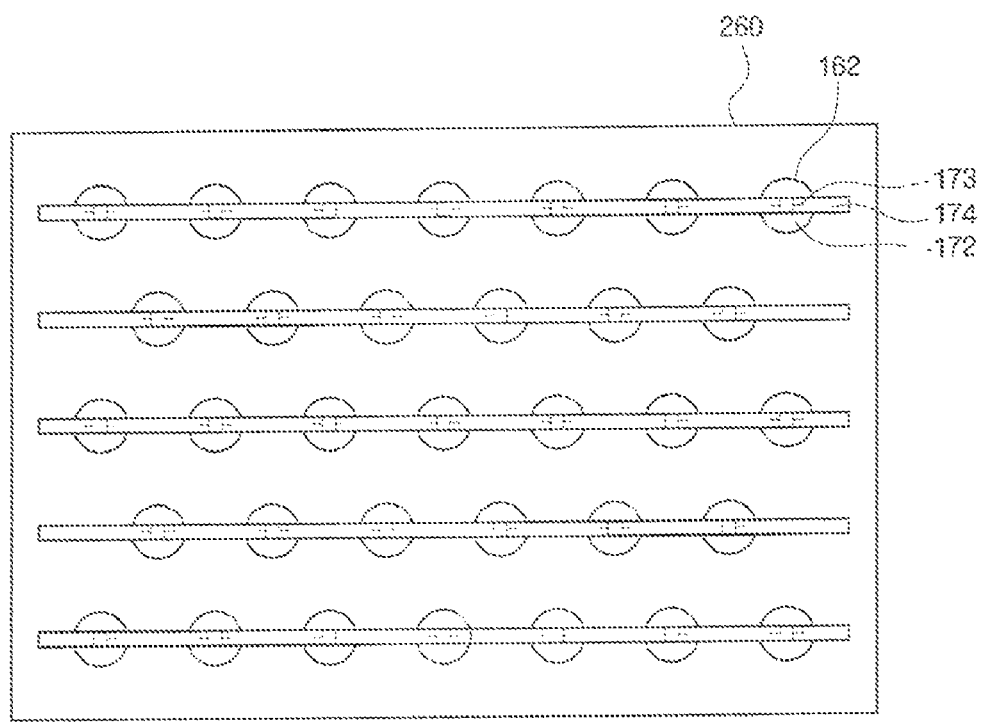
FIG. 3 is a plan view illustrating an embodiment of the backlight assembly according to another embodiment of the present invention.

FIG. 3 is a plan view illustrating an embodiment of the backlight assembly according to another embodiment of the present invention.

Referring to FIG. 3, the light generating unit 170 includes the point light sources 172, the power supply line 173 and the substrate 174. The point light source 172 is connected to the substrate and the power supply line 173 supplies the driving voltage generated to the point light source 172.

The receiving container 160 has an embossing 162 that corresponds to the point light source 172. The embossing 162 reflects and gathers the light from the light generating unit 170. The embossing 162 is used to control the light from the light generating unit 170. The point light source 172 and the embossing 162 may be arranged in a zigzag type pattern. The patterns in each row are aligned, but the patterns in the columns are not aligned.

Figure 4:
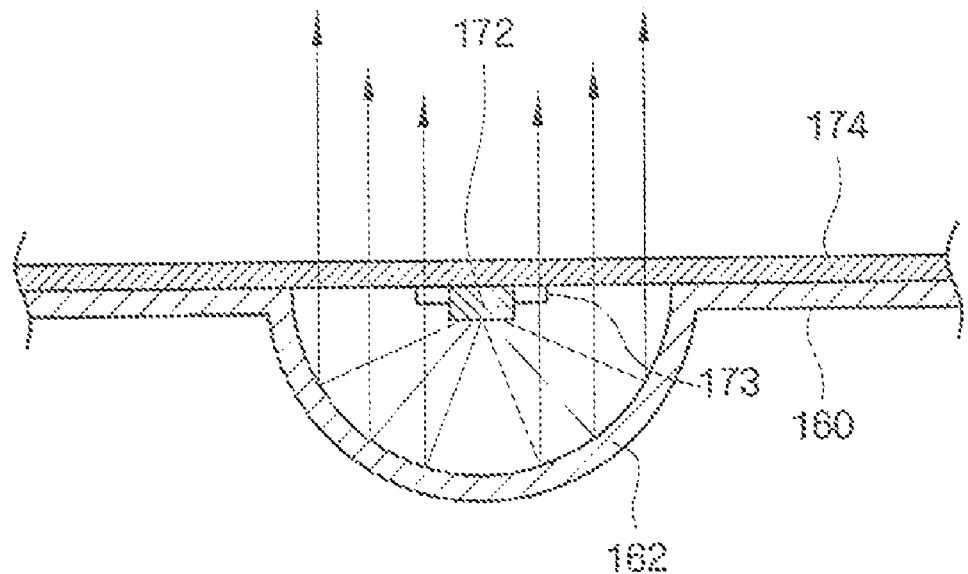
FIG. 4 is a cross-sectional view taken along a line A-A' in FIG. 2.

FIG. 4 is a sectional view taken along a line A-A' in FIG. 2.

Referring to FIG. 4, the light generating unit 170 includes point light sources 172, a power supply line 173 and a substrate 174. The point light source 172 is connected to the substrate 174, and the power supply line 173 supplies the driving voltage generated to the point light source 172.

The receiving container 160 has an embossing 162 that corresponds to the point light source 172. The light from the point light source 172 is reflected by the embossing 162. The section of embossing may have a spherical shape or diverse shapes.

Figure 5:
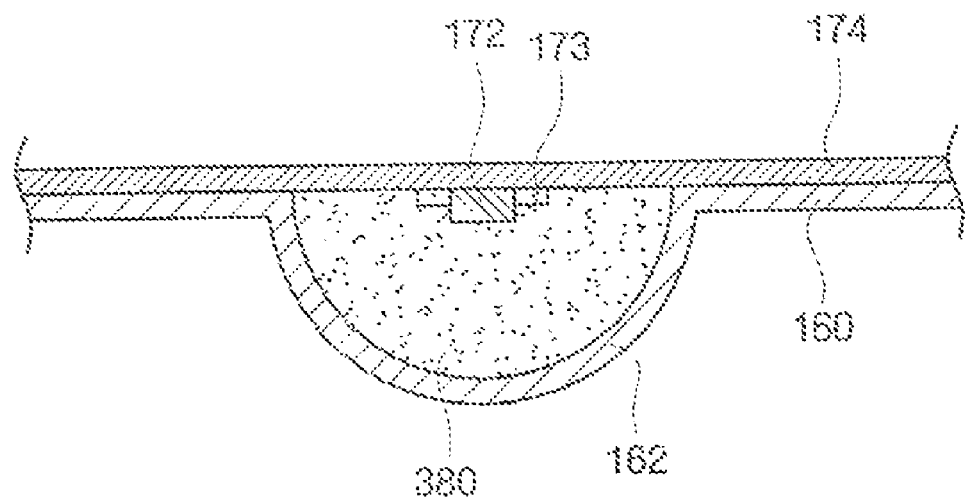
FIG. 5 is a cross-sectional view illustrating a backlight assembly according to another embodiment of the present invention.

FIG. 5 is a sectional view illustrating a backlight assembly according to another embodiment of the present invention.

Referring to FIG. 5, the light generating unit 170 includes point light sources 172, a power supply line 173 and a substrate 174. The point light source 172 is connected to the substrate and the power supply line 173 supplies the driving voltage generated to the point light source 172.

The receiving container 160 has an embossing 162 that corresponds to the point light source 172. The light from the point light source 172 is reflected by the embossing 162. The embossing 162 may be filled with filler. The role of the filler is to protect the point light source and to reinforce the connection between the receiving container 160 and the substrate 174. For example, the filler includes at least one material of silicon, epoxy and acryl.

What is claimed is:

1. A backlight assembly comprising:
   a light generating unit comprising a substrate and a point light source connected to one side of the substrate facing a receiving container; and
   the receiving container positioned to receive the light generating unit, the receiving container comprising an embossing that corresponds to the point light source.

2. The backlight assembly of claim 1, wherein the light-generating unit further comprises a power supply line configured to supply a power source for driving the point light source and the point light source connected to the substrate is toward the receiving container.

3. The backlight assembly of claim 2, wherein the receiving container comprises a bottom plate and a sidewall protruding from an edge portion of the bottom plate to define a receiving space.

4. The backlight assembly of claim 3, wherein the substrate is a printed circuit board (PCB).

5. The backlight assembly of claim 4, wherein the point light source is a light emitting diode (LED).

6. The backlight assembly of claim 5, wherein a section of the embossing has a spherical shape.

7. The backlight assembly of claim 5, wherein the light emitting diode and the embossing are arranged in a matrix type pattern.

8. The backlight assembly of claim 5, wherein the light emitting diode and the embossing are arranged in a zigzag type pattern.

9. The backlight assembly of claim 5, wherein the embossing is filled with filler.

10. The backlight assembly of claim 9, wherein the filler comprises at least one material of silicon, epoxy and acryl.

11. A display device comprising:
    a display unit configured to display an image by using light, the display unit comprising:
       a first substrate comprising pixel electrodes; and
       a second substrate located opposite the first substrate, the second substrate comprising a color filter corresponding to the pixel electrodes to display images; and
    a backlight assembly located opposite the display unit, the backlight assembly comprising:
       a light-generating unit comprising a substrate and a point light source connected to one side of the substrate facing a receiving container; and the receiving container positioned to receive the light-generating unit, the receiving container comprising an embossing that corresponds to the point light source.

12. The backlight assembly of claim 11, wherein the light-generating unit further comprises a power supply line configured to supply a power source for driving the point light source.

13. The backlight assembly of claim 12, wherein the receiving container comprises a bottom plate and a sidewall protruding from an edge portion of the bottom plate to define a receiving space.

14. The backlight assembly of claim 13, wherein the substrate is a printed circuit board (PCB).

15. The backlight assembly of claim 14, wherein the point light source is a light emitting diode (LED).

16. The backlight assembly of claim 15, wherein the section of embossing has a spherical shape.

17. The backlight assembly of claim 15, wherein the light emitting diode and the embossing are arranged by matrix type.

18. The backlight assembly of claim 15, wherein the light emitting diode and the embossing are arranged by zigzag type.

19. The backlight assembly of claim 15, wherein the embossing is filled with filler.

20. The backlight assembly of claim 19, wherein the filler comprises at least one material of silicon, epoxy and acryl.

21. A method of making a backlight assembly, the method comprising:
  providing a light generating unit comprising a substrate and a point light source connected to one side of the substrate facing a receiving container; and
  positioning the receiving container comprising an embossing corresponding to the point light source such that the receiving container is in a position to receive the light generating unit.

22. The method as recited in claim 21, wherein the embossing corresponds to the point light source.

23. The method as recited in claim 22, wherein the light-generating unit further comprises a power supply line configured to supply a power source for driving the point light source and the point light source connected to the substrate is toward the receiving container.

24. The method as recited in claim 23, wherein the receiving container comprises a bottom plate and a sidewall protruding from an edge portion of the bottom plate to define a receiving space.

25. The method as recited in claim 24, wherein the substrate is a printed circuit board(PCB) and the point light source is a light emitting diode (LED).

* * * * *